United States Patent
Slot

(10) Patent No.: US 8,182,232 B2
(45) Date of Patent: May 22, 2012

(54) WIND GENERATOR BLADE WITH DIVERGENT TRAILING EDGE

(75) Inventor: Mark Olaf Slot, Silkeborg (DK)

(73) Assignee: Gamesa Innovation & Technology, S.L., Pamplona (Navarra) (ES)

( * ) Notice: Subject to any disclaimer, the term of this patent is extended or adjusted under 35 U.S.C. 154(b) by 670 days.

(21) Appl. No.: 12/301,695

(22) PCT Filed: May 29, 2007

(86) PCT No.: PCT/ES2007/000312
§ 371 (c)(1),
(2), (4) Date: Nov. 20, 2008

(87) PCT Pub. No.: WO2007/138136
PCT Pub. Date: Dec. 6, 2007

(65) Prior Publication Data
US 2009/0263252 A1    Oct. 22, 2009

(30) Foreign Application Priority Data
May 31, 2006    (ES) ................. 200601444

(51) Int. Cl.
*B63H 1/26*    (2006.01)
*B63H 7/02*    (2006.01)

(52) U.S. Cl. ........... 416/228; 416/238; 416/223 R; 416/242; 416/243; 416/248

(58) Field of Classification Search ........... 416/228, 416/238, 248, DIG. 5, 223 R, 242, 243
See application file for complete search history.

(56) References Cited

U.S. PATENT DOCUMENTS

| 1,893,064 | A |  | 1/1933 | Zaparka |  |
| 4,961,686 | A | * | 10/1990 | Blair et al. | 416/223 A |
| 5,076,516 | A |  | 12/1991 | Wheat et al. |  |
| 7,946,803 | B2 | * | 5/2011 | Wobben | 415/4.3 |
| 2003/0077178 | A1 | * | 4/2003 | Stearns | 416/223 R |
| 2004/0022635 | A1 | * | 2/2004 | Vanmoor | 416/242 |
| 2007/0036657 | A1 | * | 2/2007 | Wobben | 416/223 R |

FOREIGN PATENT DOCUMENTS

| DE | 100 21 850 | 11/2001 |
| EP | 1 112 928 | 7/2001 |

* cited by examiner

*Primary Examiner* — Michelle Mandala
(74) *Attorney, Agent, or Firm* — Ladas & Parry LLP

(57) ABSTRACT

A wind turbine blade having an aerodynamic profile (5) with a leading edge (11), a trailing edge (13) and suction and pressure sides (17, 19) between the leading edge (11) and the trailing edge (13) which has, on at least one part of the wind turbine blade, a Trailing Edge Region (TER), the transversal section of which increases in the direction of the trailing edge (13). Said trailing edge region (TER) preferably has a divergent form with a curved concave surface on its lower part.

5 Claims, 1 Drawing Sheet

WIND GENERATOR BLADE WITH DIVERGENT TRAILING EDGE

FIELD OF THE INVENTION

The invention relates to an aerodynamically optimised wind turbine blade and in particular to a wind turbine blade with a diverging trailing edge.

BACKGROUND

Aerodynamical profiles having shapes that provide high lift/drag ratios such as laminar profiles are not used on wind turbine blades because they are very sensitive to leading edge roughness.

Wind turbine blades generally have shapes with a sharp trailing edge or a moderately blunt trailing edge, due on some occasions to production deviations, from which the wake is shed. The strength, distribution and direction of wake turbulence separation and vorticity, and the location of the beginning of the wake are sources of increased drag and reduced lift, both of which are highly undesirable.

Trailing edge devices intended to increase lift are known although they usually have a negative effect on drag.

One of these devices is a Gurney flap, shown schematically in FIG. 1, mounted perpendicularly to the chord. A Gurney flap produces two vortices that form a separation bubble that cause a lift increase. It also postpone the separation of the airflow allowing a good behaviour at high angles of attack. However the Gurney flap causes extra drag.

EP 1 314 885 discloses a trailing edge device consisting of a serrated panel to be attached to the trailing edge of the blade.

DE 10021850 discloses a trailing edge extension that can take different geometries by elastic deformation.

None of these devices produces a satisfactory increase of wind turbine efficiency, therefore a continuing need exists for wind turbine blades with an aerodynamic optimised profile.

SUMMARY OF THE INVENTION

An object of the present invention is to provide a wind turbine blade having a profile which improves the leading edge roughness sensitivity and thus decreases the uncertainty in loads and aerodynamic efficiency, increasing the functional reliability of the blade.

Another object of the present invention is to provide a wind turbine blade having a profile which improves the lift allowing wind turbine blades with better aerodynamic performance and/or wind turbine blades with a reduced chord length for easier transportation.

Another object of the present invention is to provide a wind turbine blade having a stiff geometry profile that provides an improved lift/drag ratio without the need of add-on devices.

These and other objects of the present invention are met by providing a wind turbine blade having an aerodynamic profile with a leading edge, a trailing edge and pressure and suction sides between the leading edge and the trailing edge, which comprises in at least a part of the blade a trailing edge region which has a cross section increase in the direction of the trailing edge.

In one aspect of the invention, said trailing edge region has a "diverging" shape (compared with the "converging" shape of standard profiles) mainly due to its pressure side having a concave curved shape.

In another aspect of the invention, the part of the wind turbine blade with a "diverging" trailing edge region is a part having a thick profile, i.e. a profile with a high thickness to chord length ratio.

Other features and advantages of the present invention will be understood from the following detailed description in relation with the enclosed drawings.

DETAILED DESCRIPTION OF PREFERRED EMBODIMENTS

Figure 1:
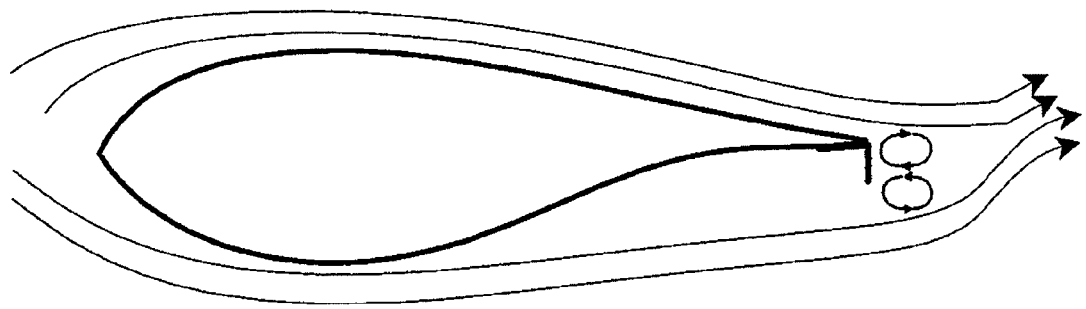
FIG. 1 is a schematic view of a known wind turbine blade profile with a Gurney flap.
Figure 2:
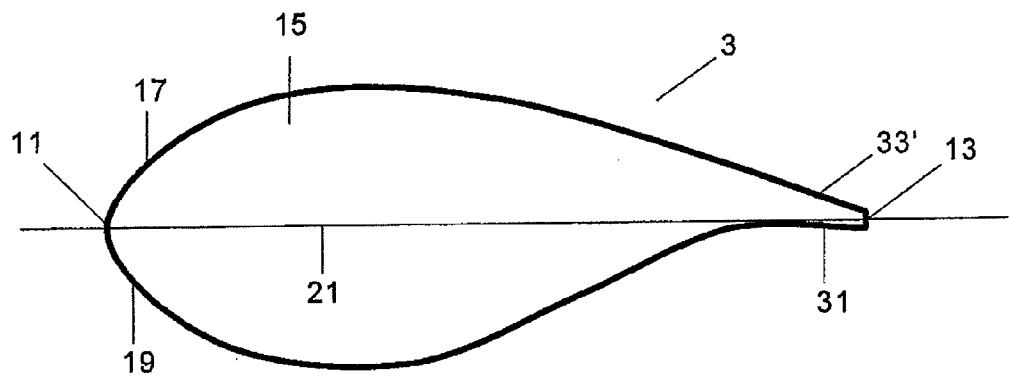
FIG. 2 is a schematic view of a standard wind turbine blade profile.

FIG. 2 shows a known standard profile 3 of a wind turbine blade having a leading edge 11, a moderately blunt trailing edge 13 and a lifting surface 15 with a suction side 17 and a pressure side 19. The chord 21 is an imaginary line drawn between the leading edge 11 and the trailing edge 13.

Figure 3:
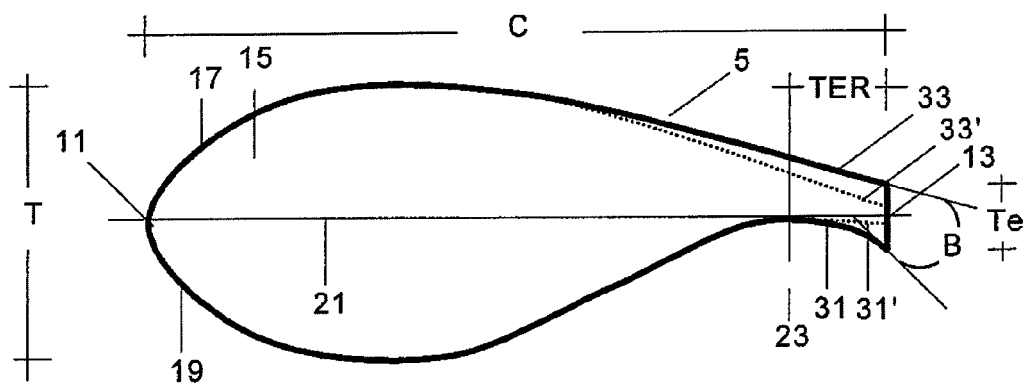
FIG. 3 is a schematic view of a wind turbine blade profile according to the present invention.

With respect to the standard profile 3, FIG. 3 shows the profile 5 of a wind turbine blade according to the invention with the following modifications concerning particularly to the pressure side and suction side zones 31, 33 near the trailing edge 13 (similar zones 31', 33' in the standard profile are included in phantom lines):

the pressure side zone 31 has a concave geometry
the suction side zone 33 is shaped to configure a thicker trailing edge 13.

As a consequence of said modifications the profile 5 has a trailing edge region TER having a cross section increase in the direction of the trailing edge 13. In other words, said zones 31, 33 near the trailing edge have a "diverging" shape compared with the "converging" shape of the known standard profile 3.

Figure 4:
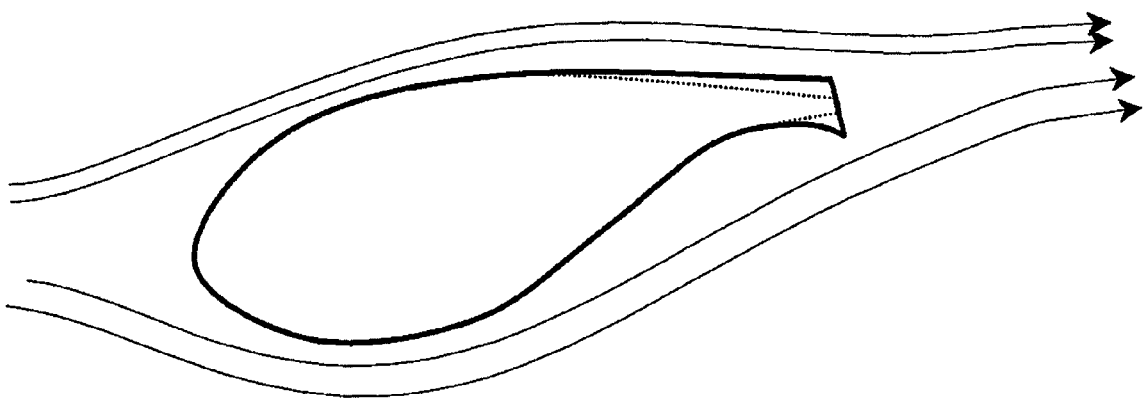
FIG. 4 is a schematic view of the performance of the wind turbine blade profile according to the present invention.

On the one hand (see FIG. 4), the thicker trailing edge 13, resulting from the "diverging" configuration of the trailing edge region TER, causes a separate flow area with low pressure behind the trailing edge region TER which, at first, tends to increase drag but the low pressure area results in boundary layer suction towards the trailing edge which stabilizes the boundary layer. This results in a stall delay, which increases maximum lift and reduces drag when operating around maximum lift. This effect is more pronounced if the leading edge is rough as a consequence of the adherence of insects or any type of grime. The drawback is a slightly increased drag at low angles of attack that is not important for the inner part of a wind turbine blade which normally runs at relatively high angles of attack On the other hand, the "diverging" configuration of the trailing edge region TER increases the maximum lift coefficient of profile 5. The concave shape of zone 31 in the pressure side 19 acts in a similar way to a Gurney flap by deflecting the flow downwards, increasing circulation and thereby shifting the lift curve towards more negative angles of attack and higher lift, but being more efficient than the Gurney flap, because the separation bubble just in front of the Gurney flap is avoided by using a smooth curved shape. The drawback is increased drag at low lift coefficients, but the drag increase is smaller than with the Gurney flap. Moreover, this effect is not important for the inner part of a wind turbine blade which normally runs at relatively high angles of attack.

In another preferred embodiment, the angle B between hypothetical tangent lines to said zones 31, 33 is in the range of 0° to 45°. In standard profiles angle B is usually negative, in the range of −20° to 0°.

In another preferred embodiment, the thickness Te of the trailing edge is in the range of 2% to 20% the chord length C.

In another preferred embodiment, the trailing edge region TER extends from a cross section 23 corresponding to a chord position in the range of 72% to 100% the chord length C, measured from the leading edge 11.

In another preferred embodiment, the part of the wind turbine blade with a "diverging" trailing edge region is a part in which the maximum thickness T to chord length C ratio is in the range of 30% to 100%. Thick profiles are especially optimized with a "diverging" trailing edge region TER which reduces the leading edge roughness sensitivity, because they normally have a poor performance with leading edge roughness.

Although the present invention has been fully described in connection with preferred embodiments, it is evident that modifications may be introduced within the scope thereof, not considering this as limited by these embodiments, but by the contents of the following claims.

The invention claimed is:

1. A wind turbine blade having an aerodynamic profile (5) with a leading edge (11), a trailing edge (13) and suction and pressure sides (17,19) between the leading edge (11) and the trailing edge (13), wherein said profile (5) comprises in at least a part of the wind turbine blade a trailing edge region TER which has a cross section increase in the direction of the trailing edge (13) and a zone (31) of the pressure side (19) at the trailing edge region TER has a concave curved surface.

2. The wind turbine blade according to claim 1, wherein an angle B between a hypothetical tangent line to zone (31) and a hypothetical tangent line to a zone (33) of the suction side (17) at the trailing edge region TER is in the range of 0° to 45°.

3. The wind turbine blade according to claim 1, wherein the trailing edge region TER extends from a cross section (23) corresponding to a chord position in the range of 72% to 100% a chord length C, measured from the leading edge (11) to the trailing edge (13).

4. The wind turbine blade according to claim 1, wherein a thickness Te of the trailing edge (13) is in the range of 2% to 20% a chord length C.

5. The wind turbine blade according to claim 1, wherein a part of the blade with a trailing edge region TER having a cross section increase in a direction of the trailing edge (13) has a maximum thickness T to a chord length C ratio in the range of 30% to 100%.

* * * * *